(12) United States Patent  
Scheer

(10) Patent No.: US 9,850,104 B2
(45) Date of Patent: Dec. 26, 2017

(54) GRIPPER FOR GRIPPING, MOVING AND DEPOSITING A PALLET

(71) Applicant: LOHR ELECTROMECANIQUE, Hangenbieten (FR)

(72) Inventor: Daniel Scheer, Still (FR)

(73) Assignee: LOHR ELECTROMECANIQUE, Hangenbieten (FR)

( * ) Notice: Subject to any disclaimer, the term of this patent is extended or adjusted under 35 U.S.C. 154(b) by 0 days.

(21) Appl. No.: 15/314,163

(22) PCT Filed: May 27, 2015

(86) PCT No.: PCT/FR2015/051406
§ 371 (c)(1),
(2) Date: Nov. 28, 2016

(87) PCT Pub. No.: WO2015/181503
PCT Pub. Date: Dec. 3, 2015

(65) Prior Publication Data
US 2017/0197810 A1      Jul. 13, 2017

(30) Foreign Application Priority Data

May 27, 2014    (FR) ..................................... 14 54779

(51) Int. Cl.
*B60P 1/44* (2006.01)
*B66C 1/42* (2006.01)
(Continued)

(52) U.S. Cl.
CPC .............. *B66C 1/425* (2013.01); *B60P 1/022* (2013.01); *B60P 1/4485* (2013.01); *B60P 3/06* (2013.01); *B62D 63/08* (2013.01); *B66C 13/46* (2013.01)

(58) Field of Classification Search
CPC ...... B60P 1/02; B60P 3/08; B60P 3/06; B60P 1/022; B60P 1/4485; B60P 1/44; B61D 3/18; B66C 1/425; B66C 13/46
(Continued)

(56) References Cited

U.S. PATENT DOCUMENTS

| 4,597,712 A | 7/1986 | Smith |
| 5,525,026 A | 6/1996 | Demonte et al. |
| 2016/0243971 A1* | 8/2016 | Scheer .................... B60P 1/483 |

FOREIGN PATENT DOCUMENTS

| CA | 2927414 A1 * | 4/2015 | ............. B60P 1/483 |
| EP | 0440915 A1 * | 8/1991 | ............. B66C 1/663 |

(Continued)

OTHER PUBLICATIONS

PCT written opinion for PCT/FR2015/051406, translation (Year: 2015).*

(Continued)

*Primary Examiner* — H Gutman
(74) *Attorney, Agent, or Firm* — Tech Valley Patent, LLC; John Pietrangelo

(57) ABSTRACT

The present invention concerns a gripper for gripping, moving, orienting, and depositing a pallet. The gripper includes a gripping means for gripping the pallet at the longitudinal side members of a pallet. The gripper is suitable for being hinged to an automated manipulator moving along a support structure, thus making it possible to move, orient, and deposit a pallet in a loading position on the support structure or in an unloading position, for example, on the ground.

20 Claims, 7 Drawing Sheets

(51) Int. Cl.
*B60P 3/06* (2006.01)
*B60P 1/02* (2006.01)
*B62D 63/08* (2006.01)
*B66C 13/46* (2006.01)

(58) Field of Classification Search
USPC .................................. 410/77; 414/542, 549
See application file for complete search history.

(56) References Cited

FOREIGN PATENT DOCUMENTS

| EP | 1277691 A1 * | 1/2003 | ............. B66C 13/46 |
| FR | 3024084 A1 * | 1/2016 | ................ B60P 3/08 |
| FR | 3025762 A1 * | 3/2016 | ............ B60P 1/5409 |
| WO | WO 2014169096 A1 * | 10/2014 | ............. B66C 13/46 |

OTHER PUBLICATIONS

International Search Report from parent PCT application PCT/FR2015/051406 dated Sep. 1, 2015, 3 pages.

\* cited by examiner

GRIPPER FOR GRIPPING, MOVING AND DEPOSITING A PALLET

CROSS-REFERENCE TO RELATED APPLICATIONS

This application is a §371 filing of PCT application PCT/FR2015/051406 filed on May 27, 2015, which claims priority from French application FR 1454779 filed on May 27, 2014. The disclosures of these applications are included by reference herein in their entirety.

BACKGROUND

Technical Field

The present invention relates to the general technical field of the transportation of freight, notably the transportation of loads placed on pallets. These loads are for example cars presenting the same or differing outlines.

More specifically, the invention especially concerns the gripper of an assembly or system for locking a palette on a support structure defining a loading space. The grippers of such a locking assembly can advantageously equip a road vehicle of the following types van, trailer, semitrailer, articulated convoy, a container destined to be loaded onto a semitrailer or a container carrier or a wagon.

Such a locking system, comprising such grippers, can also be used within a warehouse or the like.

Description of the Prior Art

It is known, for example, from U.S. Pat. No. 4,597,712 an apparatus for loading and unloading semitrailers. This apparatus is mounted at the rear end of a loading space and comprises articulated arms for laterally gripping a vehicle bearing on wheel supports and for moving the assembly to a loading position. The various operations and movements are controlled by an operator working at a control console.

Such an apparatus, apart from its complexity, has the drawback of being continuously controlled by an operator. In addition, the operator does not always have all of the information necessary for optimal loading, unloading, optimal transportation or distribution imposing special restrictions. It can thus happen that the loads, including vehicles, are placed in non-optimal, even dangerous, loading positions or that the locking of loads onto their support structure is either not performed or is insufficient. This would result in an obvious lack of safety during transportation, in particular at the expense of the integrity of the loads. The operator would be placed in danger when verifying the correct attachment of the loads.

U.S. Pat. No. 5,525,026 A describes a device for storing and/or transporting goods with irregular shapes, such as vehicles and using pallets upon which these vehicles are placed. A crane moving longitudinally along rails within a trailer carries a pallet longitudinally and vertically from a loading area to a selected front storage position and cause the pallet to rotate on a non-vertical axis, so that it passes from a loading position to a transportation position. The crane includes a pre-programmable automatic control which can control the operation of the crane and select positions and storage orientations in order to optimize the use of the space within the trailer. A telescopic pin provided at each end of the pallet allows the pallets to be attached, in a non permanent way, to the walls of the trailer and to be oriented in the desired storage position. To this end, each pin is designed to penetrate one of the receptor orifices distributed within the walls of the trailer. A light source provided behind each hole helps to visually ensure the proper engagement of each telescopic pin within a receptor orifice.

By design, including the fact that it uses a crane for the handling of pallets, the device of U.S. Pat. No. 5,525,0261 A does not allow pallets to be positioned within the upper part of the space within the trailer, especially without having to change it in a way that would greatly exceed the maximum permitted height. This system, using a single pin provided at each corner of the pallet for locking, limits the number of possible positions for the pallets within the locations provided for the receptor orifices distributed within the walls of the trailer. Furthermore, particularly in the case where a pin would not engage with the intended receptor orifice, the palette would not be restrained correctly and would be a source of danger. Similarly the visual inspection means of the locking of each pin, in addition to being cumbersome, bulky, expensive and unreliable, could easily be hindered or damaged and thus completely unusable. This is likely to affect the reliability of the locking.

DISCLOSURE OF THE INVENTION

The object of this invention is therefore to overcome the drawbacks of the prior art by providing a new simple and efficient pallet gripper.

A further object of the present invention is to propose a new locking assembly or system, comprising grippers, that ensures the reliable locking of a pallet on a support structure.

A further object of the present invention is to provide a new locking assembly or system, comprising grippers, allowing the use of palettes and support structures that do not need to be directly powered by an electrical, hydraulic or pneumatic energy source.

The objects of the invention are achieved by means of a gripper to grasp, move, orient and deposit a pallet, comprising attachment means for gripping the pallet along the longitudinal side members of said pallet, characterized in that said gripper is designed to be hinged on an automated manipulator moving along a support structure, thereby allowing the pallet to be moved, oriented and deposited in a loading position on the support structure or in an unloading position for example on the ground.

In one embodiment of the gripper according to the invention, the attachment means comprise:
 a centering pin protruding from the lower face of the gripper, designed to engage in a centering hole formed on the upper face of a side member, and
 two snap locks of the twistlock type, located on either side of the centering pin and driven by means of an actuator and a spindle integrated into the gripper in order to rotate said snap locks from a release orientation to a locked orientation of the pallet and vice versa, said snap locks being designed to engage in attachment openings formed on the upper face of the side member.

In one embodiment according to the invention, the gripper comprises an inductive sensor for detecting the contact of the upper face of the side member with the lower face of the gripper when the centering pin is fully engaged in the centering hole.

In one embodiment of the gripper according to the invention, the attachment means comprise at each gripper snap lock, a load sensor to verify, at the start of the lifting of the pallet by the grippers, that each snap lock, in its locking orientation, is correctly attached to the corresponding side member.

In one embodiment of the gripper according to the invention, each load sensor comprises an analog output proximity sensor associated with a Belleville washer system, the compression of which, as a function of the load being raised by a gripper, results in a relative displacement between a target, supported by the Belleville washer system, and the proximity sensor, the amplitude of the output signal from said proximity sensor being directly dependent upon the mass being raised.

In one embodiment according to the invention, the gripper comprises actuation means suitable for being arranged in a position in which they mechanically engage with drive members of said pallet, said drive members moving locking/unlocking studs of said pallet.

The actuation means are advantageously intended to be entirely received within the side members.

In one embodiment of the gripper according to the invention, the actuation means are arranged in a protruding manner on a lower face of each gripper, said lower face coming into contact with an upper face of a side member during its attachment and said side member presenting an opening on its upper face for receiving said actuation means.

In one embodiment of the gripper according to the invention, the actuation means comprise an actuator, of the hydraulic cylinder type, having a control rod whose free end is designed to cooperate with the drive members.

The objects of the invention are also achieved with the help of a loading and storage system equipped with a support structure for storing loaded or unloaded pallets, a manipulator with grippers, such as those described above, allowing for the gripping, moving, orienting and depositing of pallets in predetermined positions on the support structure.

An advantage of the gripper according to the invention lies in its simplicity and limited overall dimensions.

A further advantage of the locking assembly, comprising grippers according to the invention, lies in taking into account a large number of data related, for example, to constraints regarding transportation, load weights and in a degree of locking reliability to ensure sufficient locking safety for the transportation of such loads. Automatic alerts can be generated by the system when one or more locking points are failing.

Another advantage of the locking assembly, comprising grippers according to the invention, lies in saving substantial time during loading and unloading operations. Specifically, the automation of these operations including those relating to the locking and unlocking of the pallets, allows the operator, for example when loading cars, to go get another car to load, whilst the automated controller proceeds with the automated placement of a car within its loading position. Similar time savings are observed during unloading operations. The locking and unlocking is performed automatically and in masked time, therefore not negatively affecting, as regards the duration, the loading and unloading of a vehicle.

An advantage of the locking assembly, comprising grippers according to the invention, resides in the high reliability and in the high level of safety that it provides and this despite a high degree of automation.

Another advantage of the locking assembly, comprising grippers according to the invention, lies in the fact that it can be adapted to all types of pallet supported loads as well as to all types of road or rail vehicles.

Another advantage of the gripper according to the invention, lies in the fact that if damaged it can easily be replaced or repaired at the end of the manipulator.

Another advantage of the invention lies in the absence of electrical, hydraulic or pneumatic input energy for the support structure and the palette, for locking and unlocking operations. The design and construction of the palette on the one hand and of the support structure on the other hand are consequently simplified. The supply of energy can therefore be limited to the manipulator and the gripper.

BRIEF DESCRIPTION OF THE FIGURES

Other features and advantages of the invention will become clearer in reading the description that follows, made in reference to the attached figures, given by way of non-limiting examples, in which.

EMBODIMENT(S) OF THE INVENTION

Structurally and functionally identical elements that appear in more than one figure are assigned the same numeric or alphanumeric reference.

Figure 1:
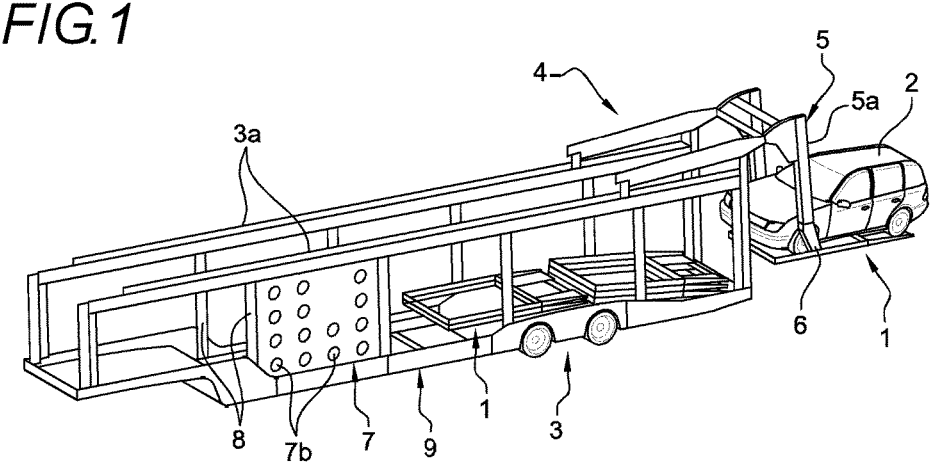
FIG. 1 is a perspective view of an embodiment of a vehicle that can be loaded and unloaded using supporting pallets, that are locked and unlocked on a support structure by means of grippers according to the invention.

FIG. 1 illustrates a loading phase in which a palette 1 supports a load 2, in this case a car, during the loading onto a vehicle, for example a semitrailer 3.

The loaded pallet 1 is moved by means of a motorized manipulator 5 which grasps the pallet 1 by means of two grippers 6. The manipulator 5 contains preferably two side arms 5a each ending in a gripper 6. The palette 1 is therefore gripped or attached via the gripper 6 on each of its sides and more specifically on each of its longitudinal side members 11.

A cart 4 carrying the manipulator 5 moves on guide rails 3a extending along and on either side of a delimited cargo space within the semitrailer 3. The cart 4 allows the manipulator 5 and consequently the palette 1 to be moved within the cargo space.

The side arms 5a are advantageously telescopic and hinged on the cart 4 and the grippers 6 are in turn hinged on the lower extremities of said side arms 5a.

The manipulator 5 allows, on the one hand, the palette 1 to be moved in a vertical direction and in a horizontal direction, and on the other hand the orientation of the palette 1 to be changed by means of the grippers 6.

The movement and orientation of the palette 1 are notably achieved by means of actuators, such as hydraulic cylinders which will not be further described in detail here. It is also possible to use electric or pneumatic actuators.

The semitrailer 3 advantageously has on its lateral sides, side walls forming a support structure 7, which is provided with housings 7b. For reasons of simplicity, the support structure 7 delimiting the cargo space is only partially shown in FIG. 1. The support structure 7 advantageously extends between the upright members 8 connecting the base 9 of the semitrailer 3 to longitudinal rails 3a.

Figure 2:
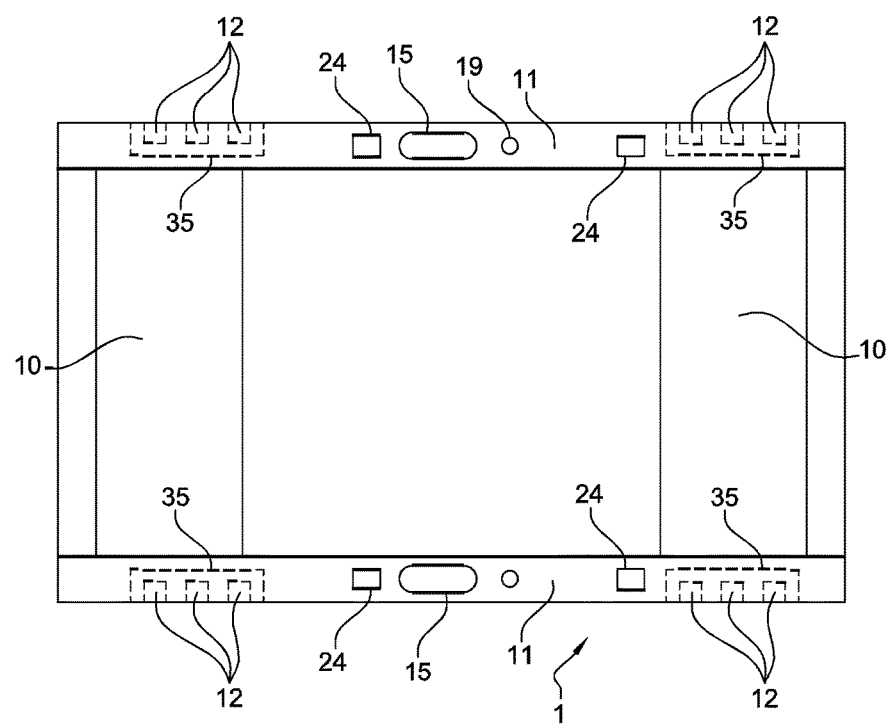
FIG. 2 is a schematic top view, of an embodiment of an empty loading pallet, designed to be locked and unlocked on a support structure by means of a gripper assembly according to the invention.

FIG. 2 is a schematic representation in top view, of an embodiment of a pallet 1. The palette 1 is for example particularly suitable for the transportation of cars. To this end, the palette 1 has two longitudinal extremity areas 10 that are intended to support the wheels of a car. The longitudinal extremity areas 10 are interconnected by means of side members 11.

The palette 1 also includes movable and retractable studs 12. The studs 12 are mounted sliding within the side members 11 of the pallet 1 and are designed to engage in housings 7b provided within the support structure 7.

The studs 12 are arranged in the vicinity of each longitudinal extremity of the side members 11, such as to constitute the locking elements of said extremities. Advantageously each end area of a side member 11 is provided with three studs 12, which are intended to be moved between a retracted position within the side member 11, corresponding to the unlocking of the palette 1, and a laterally protruding position (not shown in this figure) on the side members 11 corresponding to the locking of said pallet 1.

There are preferably three studs 12 at each end area of a side member 11, although this number may be equal to two or more than three. Having several studs 12 at each end area of a side member 11 has several advantages.

First of all, this multiplicity of studs 12 allows finer positioning for each pallet 1 for a given number of housings 7b arranged within the support structure 7. Thus, for the same number of housings 7b, having several studs 12 multiplies the number of potential positions and orientations for each pallet 1.

This multiplicity of studs 12 then provides better safety for the assembly, because the provision of several studs 12 at each end area of a side member 11 allows for an increase in the probability of at least one of these studs 12, located at each end of the side member, engaging in a housing 7b when locking the palette 1. Specifically, for example in the case of the distortion of a pallet or of the support structure 7, it can occur that for a given pallet locking position, a stud 12 designed to engage in a housing 7b is not in front of it, but that thanks to the invention a different stud 12 is then able to engage in it.

Figure 3:
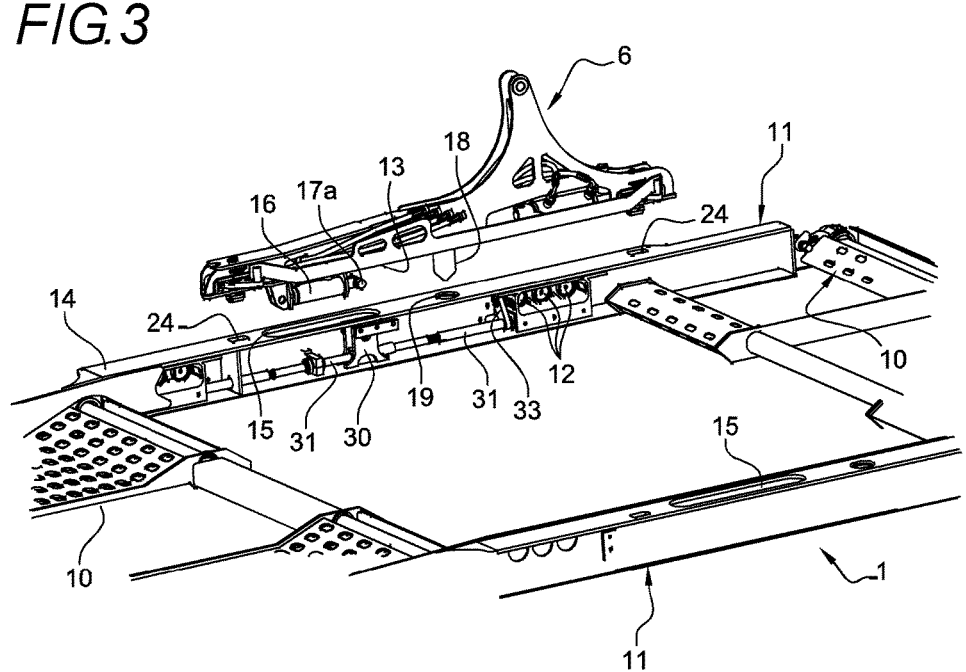
FIG. 3 is a perspective view of an embodiment of a gripper positioned next to a palette to be grasped, which incorporates some of the elements constituting said gripper according to the invention.

FIG. 3 shows in perspective view an embodiment of a gripper 6 positioned next to a pallet 1 to be grasped.

The pallet 1 advantageously incorporates some of the elements of a locking assembly for immobilizing the pallet 1 on the support structure 7. To this end each side member 11 includes drive members for moving the studs 12.

The locking assembly according to the invention also comprises removable actuation means, arranged within or on the pallet 1, in a position of mechanical cooperation with the drive members. The actuation means are used to control the movement of the studs 12. The actuation means are advantageously carried by the grippers 6.

The grippers 6 also include attachment means for grasping the pallet 1 along the side members 11. The attachment thus performed allows motorized, and, if necessary, automated manipulators 5 to move, orient and deposit the pallet 1 in a predetermined loading position on the support structure 7.

Figure 4:
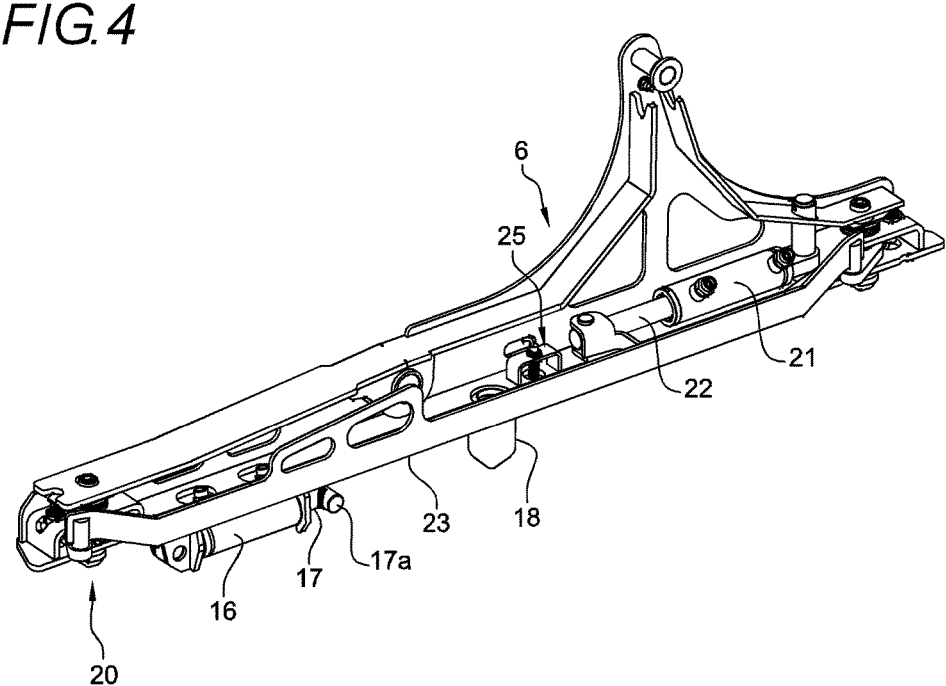
FIG. 4 is a perspective view of an embodiment of the pallet gripper of FIG. 3.
Figure 5:
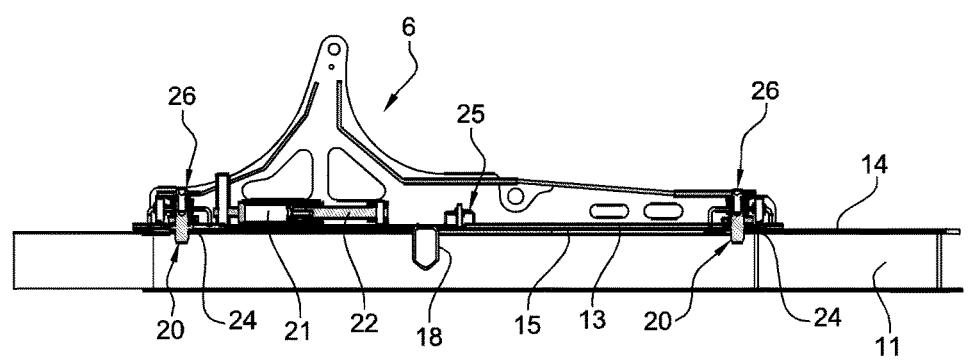
FIG. 5 shows in longitudinal section, the gripper of FIG. 3.

The gripper 6 shown in particular in FIGS. 3, 4 and 5 therefore advantageously carries the actuation means. The latter are at least partially arranged protruding from the lower face 13 of the gripper 6.

The lower face 13 is intended to come into contact with an upper face 14 of the side member 11 during the attachment of the gripper 6 to said side member 11. To this end the upper face 14 preferably presents an opening 15 for receiving the actuation means when the pallet 1 is fastened to the gripper 6. The actuation means thus extend at least partially within the side member 11.

Figure 7:
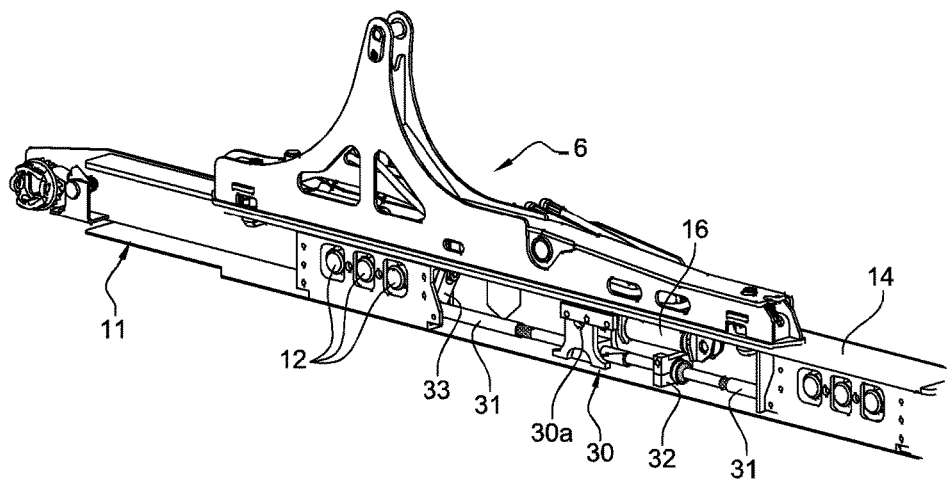
Figure 8:
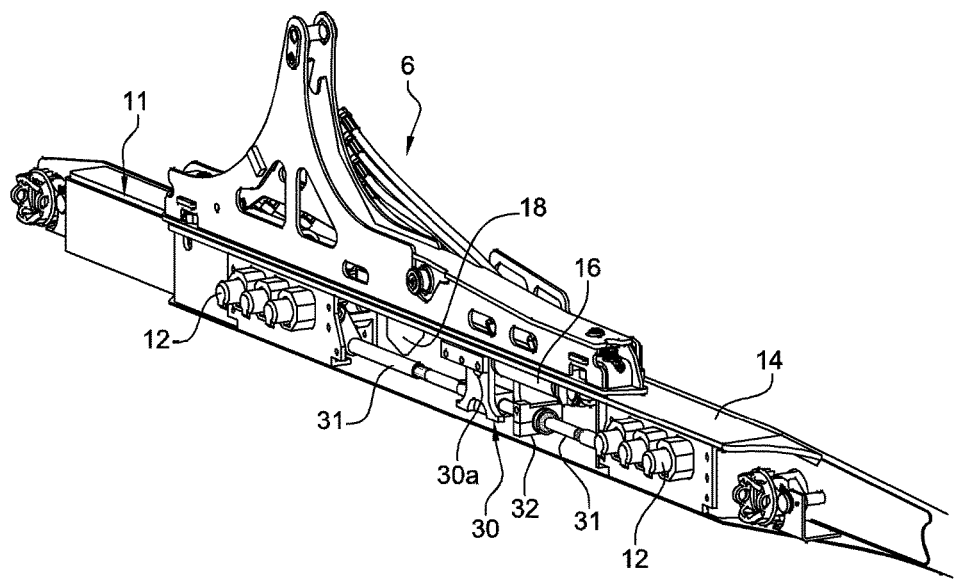

In a preferred embodiment of the invention, the actuation means are advantageously fully received into the opening 15 on each side member 11, as can be seen in FIGS. 7 and 8. This feature allows the distance between the grippers 6 and the pallets 1 to be reduced, which in particular allows the pallets 1 to be positioned in elevated place while minimizing the amount of empty space necessary above the semitrailer 3 during this operation.

Similarly, the fact that the actuation means are fully received within each side member 11 allows them to apply their torque directly to the drive members that move the studs 12 without an intermediate mechanical connection, thus offering greater reliability and power to the assembly.

The actuation means preferably comprise an electric actuator 16 or a hydraulic cylinder or a pneumatic type actuator. The actuator 16 has a rod 17 whose free end 17a is designed to cooperate with the drive members.

Figure 6:
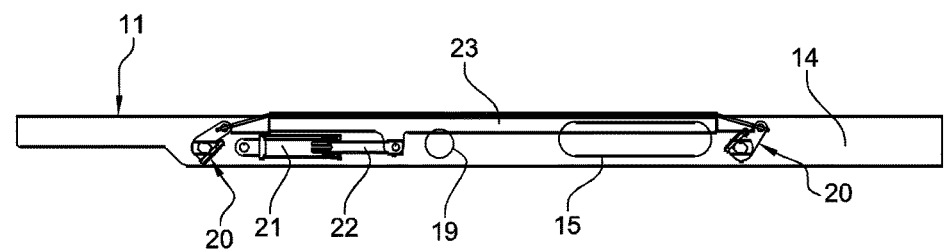
FIG. 6 shows, according to a partial top view, an embodiment of the gripper of FIG. 3, FIGS. 7 and 8 illustrate partially and in perspective a gripper attached to a pallet, with a locking assembly according to the invention respectively in an unlocked state and in a locked state.

The attachment means are described in more detail by means of FIGS. 5 and 6.

FIG. 5 represents a cross-sectional view of the gripper 6 showing the attachment means. These are also shown in their relative positions with respect to the side member 11 in FIG. 6.

The attachment means comprise a centering pin 18 protruding from the lower face 13 of the gripper 6. This centering pin 18 is designed to engage with a centering hole 19 formed on the upper face 14 of the side member 11 during the attachment of the pallet 1 to the gripper 6.

The attachment means also comprise two twistlocks 20 which are located on either side of the centering pin 18.

The attachment means also include an attachment actuator 21 housed within the gripper 6. The attachment actuator 21, of the hydraulic cylinder type, has a rod 22 connected to a spindle 23. The latter interconnects the twistlocks 20 in such a way as to rotate them from a release position of the pallet 1 to a locking position of the pallet 1 and vice versa under the action of the rod 22.

The twistlocks 20 are intended to engage with attachment openings 24 formed on the upper face 14 of side member 11.

The shape of the twistlocks 20 is chosen in order to complement the shape of the attachment openings 24, in such a way as to secure the side member 11 to the gripper 6 when said twistlocks 20 are in a locking orientation. Conversely when the twistlocks 20 are in their release orientation, the complementary shapes of said twistlocks 20 and the attachment openings 24 allow the gripper 6 to free from the side member 11.

Advantageously, the gripper 6 comprises an inductive sensor 25 for detecting the contact of the upper face 14 of side member 11 with the lower face 13 of the gripper 6 when the centering pin 18 is fully engaged in the centering hole 19.

In a preferred embodiment of the locking assembly according to the invention, the attachment means also comprise at each twistlock 20 a load sensor 26. Said load sensor 26 is used to determine at the start of the lifting of the pallet 1 by the grippers 6, illustrated by the arrow 20a, if the attachment is performed correctly. The load sensor 26 can thus detect, when the twistlocks 20 are in their locking position, that the side member 11 is correctly attached to said twistlocks 20.

Figure 9:
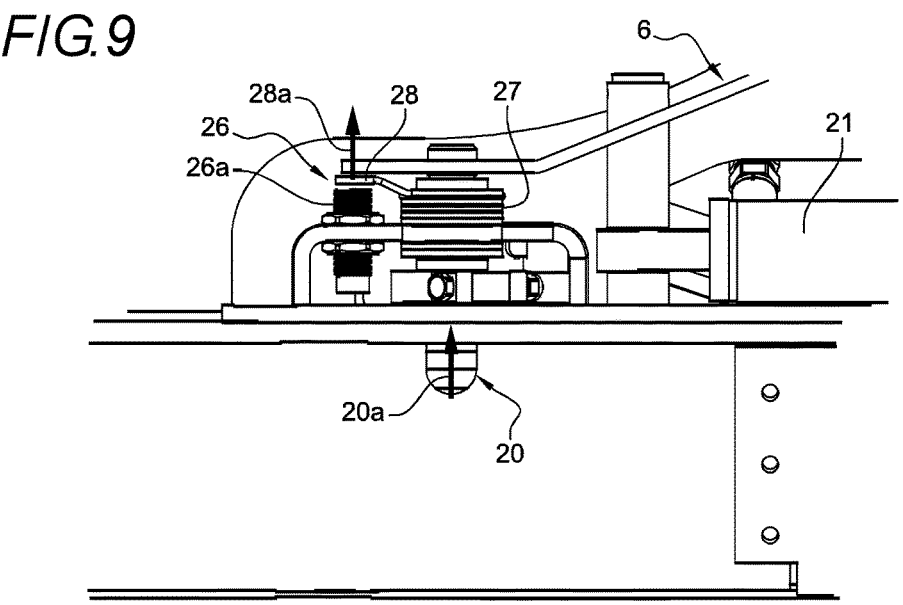
FIG. 9 represents in cross-sectional view, an expanded detail A from FIG. 4, FIGS. 10 and 11 illustrate partially and in cross-sectional view a locking stud of a locking assembly comprising grippers according to the invention, integrated into a palette and respectively in an unlocked state and in a locked state.

Each load sensor 26 is advantageously implemented with a proximity sensor 26a. The latter, having an analog output, is associated with a Belleville washer system 27, the compression of which, as a function of the load being raised by the grippers 6, results in a relative displacement between a target 28, supported by the Belleville washer system, and said proximity detector 26a. The amplitude of the output signal from the proximity sensor is thereby dependent upon the mass raised. The movement of the target 28 is schematically shown for example by the arrow 28a in FIG. 9.

The use of load sensors 26, called intelligent, makes it possible for example to determine the mass raised, to calculate the center of gravity of the raised load, to calculate the total transported load, to calculate the center of gravity of the load and the axle weight. The operator can thus verify that the maximum axle load is not exceeded.

To this end, electronic and computer means are advantageously associated with the load sensors 26. The variety of information delivered by the load sensors 26 and thereby the calculations relating thereto may advantageously be stored in a "black box" for the purpose of subsequent checks.

The drive members of the locking assembly according to the invention are shown more particularly in FIGS. 3, 7 and 8.

The drive members comprise a mobile yoke 30 mounted movable in translation within the side member 11. The yoke 30 is designed to slide within the longitudinal member 11.

The yoke 30 preferably has an anchor recess 30a for receiving the free end 17a of the rod 17 of the actuator 16.

The drive members also comprise a connecting rod 31, threaded, passing through the tapped yoke 30. The connecting rod 31 thereby presents a thread that engages with the tapping of the yoke 30 in such a way as to transform a translational movement of the yoke 30 into a rotational movement of said connecting rod 31. The connecting rod 31 is preferably held by at least one bearing 32, integral to the side member 11, and provided with a bushing or a roller bearing.

The connecting rod 31 has a cam 33 at each end that is kinematically connected to studs 12 for transforming a rotational movement of said connecting rod 31 into a translational movement of said studs 12.

Figure 11:
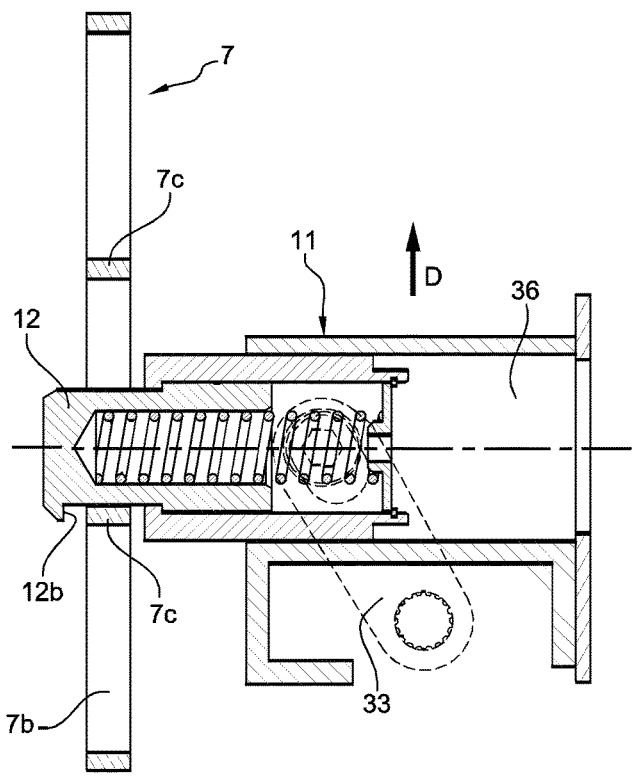
Figure 10:
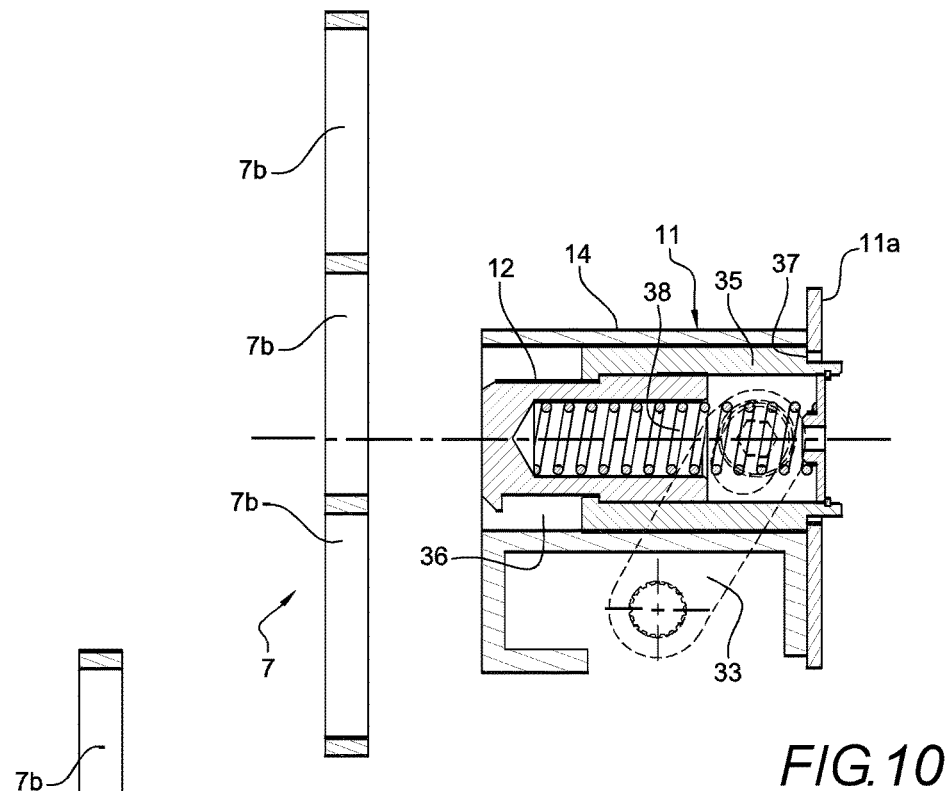
Figure 12:
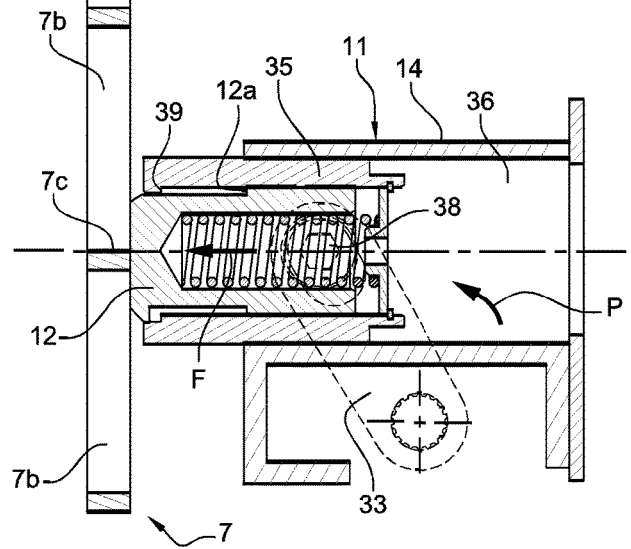
FIG. 12 illustrates partially and in cross-sectional view a locking stud of a locking assembly including grippers according to the invention, integrated in a position wherein it butts against the support structure preventing said stud from locking.

The studs 12, represented for example in greater detail in FIGS. 10, 11 and 12, are advantageously mounted within a block 35 which is mounted sliding within the side member 11. The block 35 thus slides transversely within the side member 11, between a locked position and an unlocked position and vice versa.

The pallet 1 comprises blocks 35 which are located at the four longitudinal ends of the pallet 1. Each block 35 comprising for example three studs 12 is preferably mounted sliding within a slide chamber 36 specifically provided within the side member 11.

Each cam 33, being rotationally integral to the connecting rod 31 and hinged to a block 35, thereby controls the transverse movement of said block 35.

In FIG. 10, the block 35 is held in an unlocked position by means of the cam 33. In this unlocked position, an internal abutment 37 of the block 35 rests against an inner face 11a of the side member 11.

The stud 12 is mounted individually sliding and preloaded in a position protruding from the block 35 by means of a spring 38. The latter allows the stud 12 to remain protruding from the block 35 in a position corresponding to a support of a peripheral edge 12a on an internal abutment 39 of the block 35. This relative position between the stud 12 and the block 35 is retained when said stud 12 is in a locked state or position in which it is engaged in a housing 7b of the support structure 7, as shown for example in FIG. 11.

For example, the stud 12 has at its free end a safety flange 12b. The latter is located preferably downwards from the free end of the stud 12 in such a way as to optionally abut against a fixed part 7c of the support structure 7 when said stud 12 is engaged within a housing 7b. This prevents any disengagement of the stud 12 from the housing 7b that could eventually result from failure of the locking assembly. The immobilization of the pallet 1 on the support structure 7 is thereby more secured. It is then appropriate to slightly raise the pallet 1 in the direction shown schematically by the arrow D in FIG. 11 in order to release the safety flange 12b prior to the movement of the studs 12 to the unlocked position.

FIG. 12 illustrates partially and in cross-sectional view a stud 12 in a position of abutting against the fixed part 7c of the support structure 7. This situation prevents the stud 12 from engaging with a housing 7b and results in the compression of the spring 39.

Thus, when the block 35 moves to a locked position on the outside of the side member 11, this movement is not prevented by any eventual incorrect positioning of one of the studs 12 in relation to a given housing 7b. The individual mounting of the studs 12 within the block 35 allows other studs 12 to engage in a corresponding housing 7b.

In FIG. 12, the arrow P schematically illustrates the pivotal movement of the cam 33 leading the block 35 towards its locked position. The arrow F schematically illustrates the force exerted by the spring 38 on the stud 12 which is almost entirely retracted into the block 35.

Such a situation does not therefore prevent the immobilization and locking of the pallet on the support structure 7. For the locking of the pallet 1 it is sufficient for only one stud 12 of each block 35 to be engaged in a housing 7b.

Advantageously a position sensor associated with each stud 12, allows for the detection and counting of the number of studs 12 abutting against an obstacle and not participating in the locking of the pallet 1. It then becomes possible to detect the number of studs 12 that are for example jammed and thus not participating in said locking. In addition, the number of inactive studs 12 can be continuously monitored during a working phase. Information relating to maintenance can thereby be generated.

Automatically moving to another pallet 1 locking position can optionally be controlled.

Figure 13:
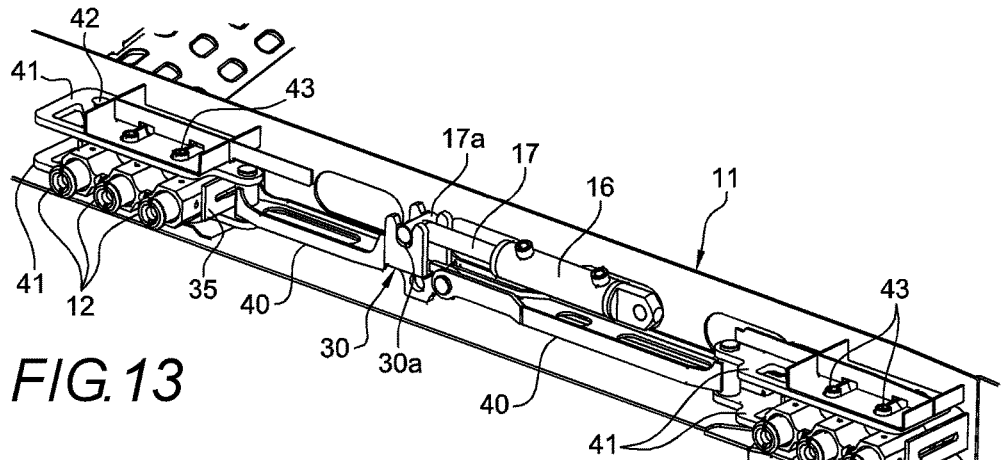
FIG. 13 illustrates according to a perspective view a further embodiment of the locking assembly comprising grippers according to the invention.
Figure 14:
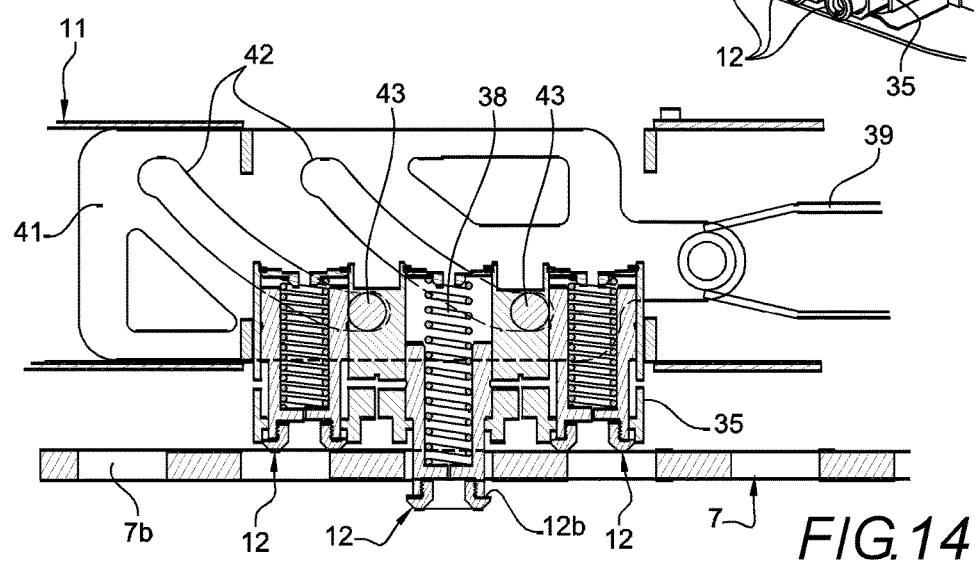
FIGS. 14 and 15 illustrate according to partial cross-sectional views, respectively a locking state and an unlocking state of the locking assembly comprising grippers of FIG. 13.
Figure 15:
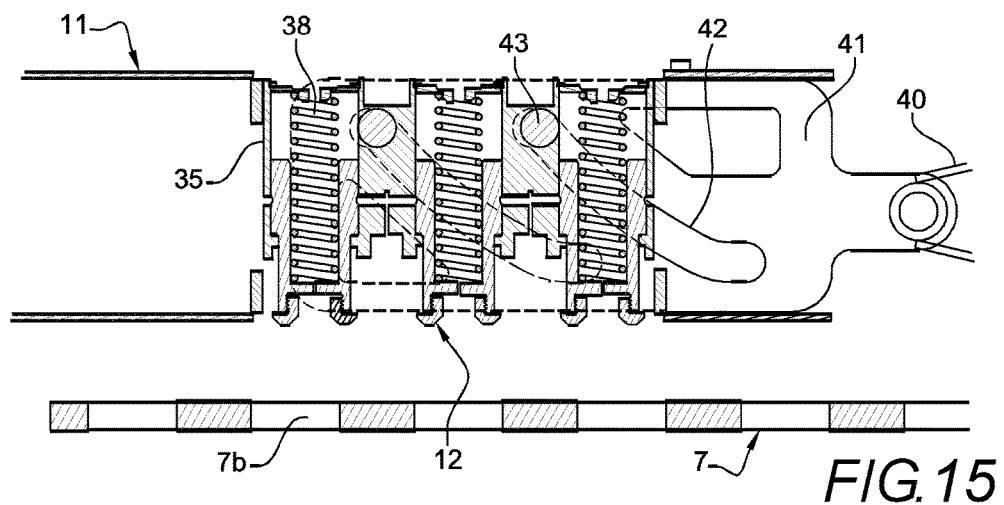

In the embodiment illustrated in FIGS. 13, 14 and 15, the yoke 30, movable in translation within the side member 11, is connected to at least a control spindle 40 extending from each side and in the direction of travel of said yoke 30. A translational movement of the yoke 30 then translationally drives the control spindle 40.

The anchor recess 30a formed within the yoke 30 is designed to receive the free end 17a of the control rod 17. The yoke 30 thus moves under the action of the control rod 17.

The control spindle 40 has at each of its ends, a guide member 41, translationally integral to the control spindle 40 and kinematically connected to studs 12 in order to transform the translational movement of the guide member 41 into movement of said studs 12, orthogonal to said translational movement.

The guide member 41 comprises an upper plate and a lower guide plate that can slide, respectively, above and below the block 35. Each guide plate is provided with oblique slots 42, within which pins 43 slide protruding above and below each block 35. The oblique slots 42 preferably have a slightly curved shape at one or both ends such as to mark the positions of the ends of travel of the pins 43 and to hold the block 35 in position.

The sliding of the guide member 41 within the side member 11 makes it possible to move the block 35 transversely with respect to said side member 11. The block 35 thus slides laterally between a locked position illustrated for example in FIG. 14 and an unlocked position illustrated for example in FIG. 15, and vice versa. The movements of the blocks 35 and the studs 12 correspond to the movements described in more detail in FIGS. 10 to 12, thereby obtaining the locking and unlocking of the pallet 1 onto walls 7.

Electronic and computer means are advantageously integrated into the locking assembly according to the invention in order to assist the movement and operation of its constituent elements. These electronic and computer means include in particular the ability to manage the signals from the inductive sensors and proximity sensors.

The locking assembly according to the invention thus exhibits very high operational safety insofar as any suspicious positioning of a locking stud 12 is detected and corrected, if necessary automatically.

It is evident that this description is not limited to the examples explicitly described, but that it also includes other embodiments and/or implementations. Thus, a technical feature described may be replaced by an equivalent technical feature, and an operational or implementation step described may be replaced by an equivalent step without going beyond the scope of the invention.

The invention claimed is:

1. A gripper for grasping a pallet, the gripper comprising attachment means for gripping the pallet along longitudinal side members of the pallet, the attachment means comprising:
   a centering pin protruding from a lower face of the gripper, the centering pin adapted to engage a centering hole on an upper face of one of the side members, and
   two snap locks located on either side of the centering pin, both of the two snap locks driven by an actuator and connecting means mounted in the gripper;
   wherein the gripper is adapted to be mounted on an automated manipulator movable along a support structure, thereby allowing the pallet to be at least one of moved, oriented, and deposited in a loading position on the support structure or in an unloading position.

2. The gripper according to claim 1, wherein the connecting means comprises one of a spindle and a system of spindles.

3. The gripper according to claim 1, wherein each of the two snap locks comprises a twistlock snap lock.

4. The gripper according to claim 3, wherein the actuator is adapted to rotate the two snap locks from a release orientation to a locked orientation, and wherein each of the two snap locks is adapted to engage an attachment opening in the upper face of one of the side members.

5. The gripper according to claim 1, wherein the gripper further comprises an inductive sensor for detecting contact of the upper face of one of the side members with the lower face of the gripper when the centering pin is fully engaged in the centering hole.

6. The gripper according to claim 1, wherein the attachment means further comprises at each of the two snap locks a load sensor, the load sensor adapted to verify that each of the two snap locks is attached to one of the side members.

7. The gripper according to claim 6, wherein the load sensor comprises a proximity sensor associated with a Belleville washer system, wherein compression of the Belleville washer system results in a relative displacement between a target supported by the Belleville washer system and the proximity sensor.

8. The gripper according to claim 1, wherein the gripper further comprises actuation means adapted to mechanically engage drive members of the pallet, the drive members adapted to move studs of the pallet.

9. The gripper according to claim 8, wherein the actuation means is fully received within one of the side members.

10. The gripper according to claim 9, wherein the actuation means protrudes from a lower face of the gripper, the lower face contacting an upper face of one of the side members during attachment and the one of the side members having an opening for receiving the actuation means.

11. The gripper according to claim 10, wherein the actuation means comprise an actuator having a control rod having a free end adapted to cooperate with the drive members.

12. A loading and storage system comprising a gripper according to claim 1.

13. The gripper according to claim 2, wherein each of the two snap locks comprises a twistlock snap lock.

14. The gripper according to claim 13, wherein the actuator is adapted to rotate the two snap locks from a release orientation to a locked orientation, and wherein each of the two snap locks is adapted to engage an attachment opening-in the upper face of one of the side members.

15. The gripper according to claim 13, wherein the attachment means further comprises at each of the two snap locks a load sensor, the load sensor adapted to verify that each of the two snap locks is attached to one of the side members.

16. The gripper according to claim 15, wherein the load sensor comprises a proximity sensor associated with a Belleville washer system, wherein compression of the Belleville washer system results in a relative displacement between a target supported by the Belleville washer system and the proximity sensor.

17. The gripper according to claim 16, wherein the gripper further comprises actuation means adapted to mechanically engage drive members of the pallet, the drive members adapted to move studs of the pallet.

18. The gripper according to claim 8, wherein the actuation means is fully received within one of the side members.

19. A gripper for grasping a pallet, the gripper comprising attachment means for gripping the pallet along longitudinal side members of the pallet,
- wherein the gripper further comprises actuation means adapted to mechanically engage drive members of the pallet, the drive members adapted to move studs of the pallet;
- wherein the actuation means is received within one of the side members;
- wherein the actuation means protrudes from a lower face of the gripper, the lower face contacting an upper face of one of the side members during attachment and the one of the side members having an opening for receiving the actuation means;
- wherein the actuation means comprise an actuator having a control rod having a free end adapted to cooperate with the drive members; and
- wherein the gripper is adapted to be mounted on an automated manipulator movable along a support structure, thereby allowing the pallet to be at least one of moved, oriented, and deposited in a loading position on the support structure or in an unloading position.

20. A loading and storage system comprising a gripper according to claim 19.

* * * * *